United States Patent
Dai et al.

(10) Patent No.: US 10,054,312 B2
(45) Date of Patent: Aug. 21, 2018

(54) PILOT MIXER COOLING HOLE ARRANGEMENT FOR FUEL NOZZLE OF A GAS TURBINE ENGINE

(71) Applicant: UNITED TECHNOLOGIES CORPORATION, Hartford, CT (US)

(72) Inventors: Zhongtao Dai, Glastonbury, CT (US); Kristin Kopp-Vaughan, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 529 days.

(21) Appl. No.: 14/631,499

(22) Filed: Feb. 25, 2015

(65) Prior Publication Data

US 2016/0245522 A1 Aug. 25, 2016

(51) Int. Cl.
*F23R 3/28* (2006.01)
*F23R 3/14* (2006.01)
*F23R 3/34* (2006.01)

(52) U.S. Cl.
CPC ............... *F23R 3/283* (2013.01); *F23R 3/14* (2013.01); *F23R 3/286* (2013.01); *F23R 3/343* (2013.01); *F23R 2900/03042* (2013.01); *Y02T 50/675* (2013.01)

(58) Field of Classification Search
CPC .... F02C 7/22; F02C 7/232; F23R 3/14; F23R 3/28; F23R 3/283; F23R 3/286; F23R 3/34; F23R 3/343; F23R 3/36; F23R 2900/00018; F23R 2900/03041; F23R 2900/03042; F23R 2900/03043; F23R 2900/03044; F23R 2900/03343; F23D 2900/00008; F23D 2900/00015; F23D 11/36; F23C 2900/07001; B33Y 80/00
See application file for complete search history.

(56) References Cited

U.S. PATENT DOCUMENTS

| | | | | |
|---|---|---|---|---|
| 6,640,546 B2 * | 11/2003 | Lee | ........................ | F01D 5/186 415/178 |
| 7,007,864 B2 * | 3/2006 | Snyder | .................... | F23D 11/10 239/105 |
| 7,721,545 B2 * | 5/2010 | Cayre | ...................... | F23R 3/14 60/737 |
| 8,119,949 B2 * | 2/2012 | Frye | .................. | B23K 26/0823 219/121.71 |
| 8,312,724 B2 * | 11/2012 | Dai | .......................... | F23R 3/14 60/737 |
| 8,806,871 B2 * | 8/2014 | McMasters | ............... | F23R 3/14 60/740 |
| 2010/0162713 A1 * | 7/2010 | Li | ............................ | F23R 3/14 60/748 |

FOREIGN PATENT DOCUMENTS

EP     2481987     8/2012

OTHER PUBLICATIONS

Extended European Search Report dated Jul. 15, 2016 in European Application No. 15201375.1.

* cited by examiner

*Primary Examiner* — William H Rodriguez
*Assistant Examiner* — Jason H Duger
(74) *Attorney, Agent, or Firm* — Snell & Wilmer L.L.P.

(57) ABSTRACT

A mixer assembly for a gas turbine engine is provided, including a main mixer, and a pilot mixer having an annular housing. The pilot mixer can further include features to cool portions of the annular housing, such as a radial edge of the annular housing.

15 Claims, 5 Drawing Sheets

PILOT MIXER COOLING HOLE ARRANGEMENT FOR FUEL NOZZLE OF A GAS TURBINE ENGINE

GOVERNMENT LICENSE RIGHTS

This disclosure was made with Government support under Contract No. NNC13TA45T awarded by the National Aeronautics and Space Administration (NASA). The U.S. Government has certain rights in the disclosure.

FIELD

The subject matter disclosed herein relates generally to combustors for gas turbine engines and more particularly to mixer assemblies for gas turbine engines.

BACKGROUND

Gas turbine engines, such as those used to power modern aircraft, to power sea vessels, to generate electrical power, and in industrial applications, include a compressor for pressurizing a supply of air, a combustor for burning a fuel in the presence of the pressurized air, and a turbine for extracting energy from the resultant combustion gases. Generally, the compressor, combustor, and turbine are disposed about a central engine axis with the compressor disposed axially upstream or forward of the combustor and the turbine disposed axially downstream of the combustor. In operation of a gas turbine engine, fuel is injected into and combusted in the combustor with compressed air from the compressor thereby generating high-temperature combustion exhaust gases, which pass through the turbine and produce rotational shaft power. The shaft power is used to drive a compressor to provide air to the combustion process to generate the high energy gases. Additionally, the shaft power is used to, for example, drive a generator for producing electricity, or drive a fan to produce high momentum gases for producing thrust.

An exemplary combustor features an annular combustion chamber defined between a radially inboard liner and a radially outboard liner extending aft from a forward bulkhead wall. The radially outboard liner extends circumferentially about and is radially spaced from the inboard liner, with the combustion chamber extending fore to aft between the liners. A plurality of circumferentially distributed fuel injectors are mounted in the forward bulkhead wall and project into the forward end of the annular combustion chamber to supply the fuel to be combusted. Air swirlers proximate to the fuel injectors impart a swirl to inlet air entering the forward end of the combustion chamber at the bulkhead wall to provide rapid mixing of the fuel and inlet air.

SUMMARY

According to various embodiments, a mixer assembly for a gas turbine engine is disclosed herein. The mixer assembly may comprise a main mixer; and a pilot mixer concentrically arranged with the main mixer. The main mixer may surround at least a portion of the pilot mixer, the pilot mixer comprising an annular housing separating the pilot mixer from the main mixer and forming a cavity. The annular housing may have a forward portion and an aft portion. The aft portion may have a larger diameter than the forward portion. A first plurality of holes may be disposed circumferentially through a horizontal wall of the annular housing in proximity to an aft edge of the annular housing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
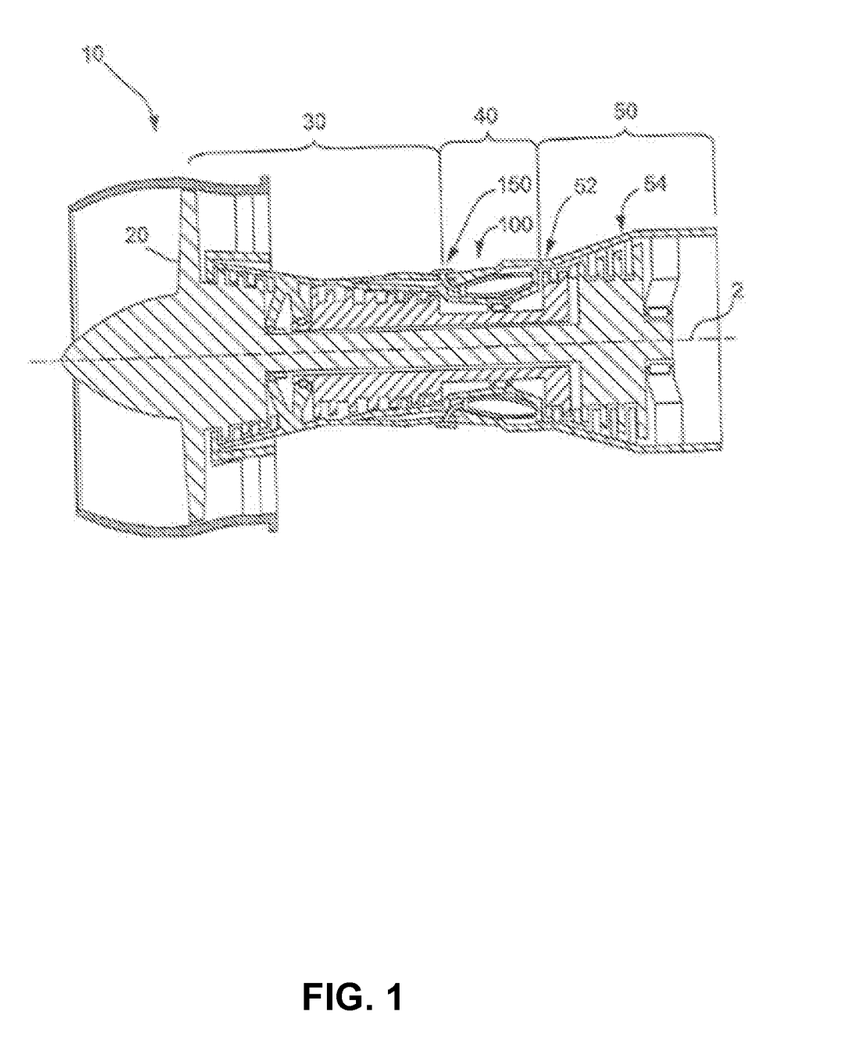
FIG. 1 is a schematic diagram of an exemplary embodiment of a gas turbine engine.

FIG. 1 is a schematic diagram of an exemplary embodiment of a gas turbine engine 10. The gas turbine engine 10 is depicted as a turbofan that incorporates a fan section 20, a compressor section 30, a combustion section 40, and a turbine section 50. The combustion section 40 incorporates a combustor 100 that includes a plurality of fuel injectors 150 that are positioned annularly about a centerline 2 of the gas turbine engine 10 upstream of the turbines 52, 54. Throughout the application, the terms "forward" or "upstream" are used to refer to directions and positions located axially closer toward a fuel/air intake side of a combustion system than directions and positions referenced as "aft" or "downstream." The fuel injectors 150 are inserted into and provide fuel to one or more combustion chambers for mixing and/or ignition. It is to be understood that the combustor 100 and fuel injector 150 as disclosed herein are not limited in application to the depicted embodiment of a gas turbine engine 10, but are applicable to other types of gas turbine engines, such as those used to power modern aircraft, to power sea vessels, to generate electrical power, and in industrial applications.

Figure 2:
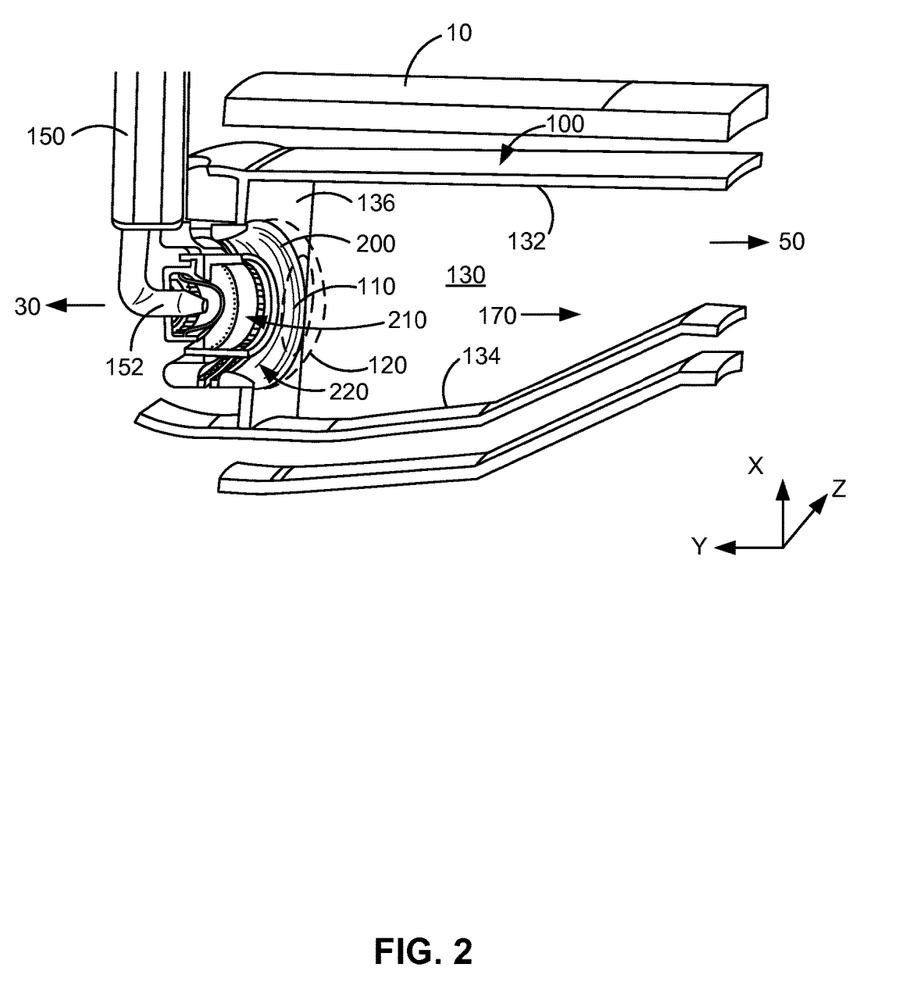
FIG. 2 is a partial perspective view of a combustor of a gas turbine engine, in accordance with various embodiments.

FIG. 2 is a partial perspective view of a combustor 100 of a gas turbine engine 10. The combustor 100 is positioned between the compressor section 30 and the turbine section 50 of a gas turbine engine 10. The combustor 100 includes an annular combustion chamber 130 bounded by an inner (inboard) wall 134 and an outer (outboard) wall 132 and a forward bulkhead wall 136 extending radially between the inner wall 134 and the outer wall 132 at the forward end of the combustor 100. The forward bulkhead wall 136 of the combustor 100 carries a plurality of mixer assemblies 200, including the fuel nozzle 152 of a fuel injector 150, a main mixer 220, and an annular pilot mixer housing 210. It will be understood that, although only a single mixer assembly 200 is shown in FIG. 2 for illustrative purposes, the combustor 100 may include a plurality of mixer assemblies 200 circumferentially distributed and mounted at the forward end of the combustor 100. A number of sparkplugs are positioned with their working ends along a forward portion of the annular combustion chamber 130 to initiate combustion of the fuel and air mixture. The combusting mixture is driven downstream within the combustor 100 along a principal flow path 170 toward the turbine section 50 of the engine 10. The fuel and air provided to the annular pilot mixer housing 210 produce a primary combustion zone 110 within a central portion of the annular combustion chamber 130. The fuel and air provided to the main mixer 220 produce a secondary combustion zone 120 in the annular combustion chamber 130 that is radially outwardly spaced from and concentrically surrounds the primary combustion zone 110.

Figure 3:
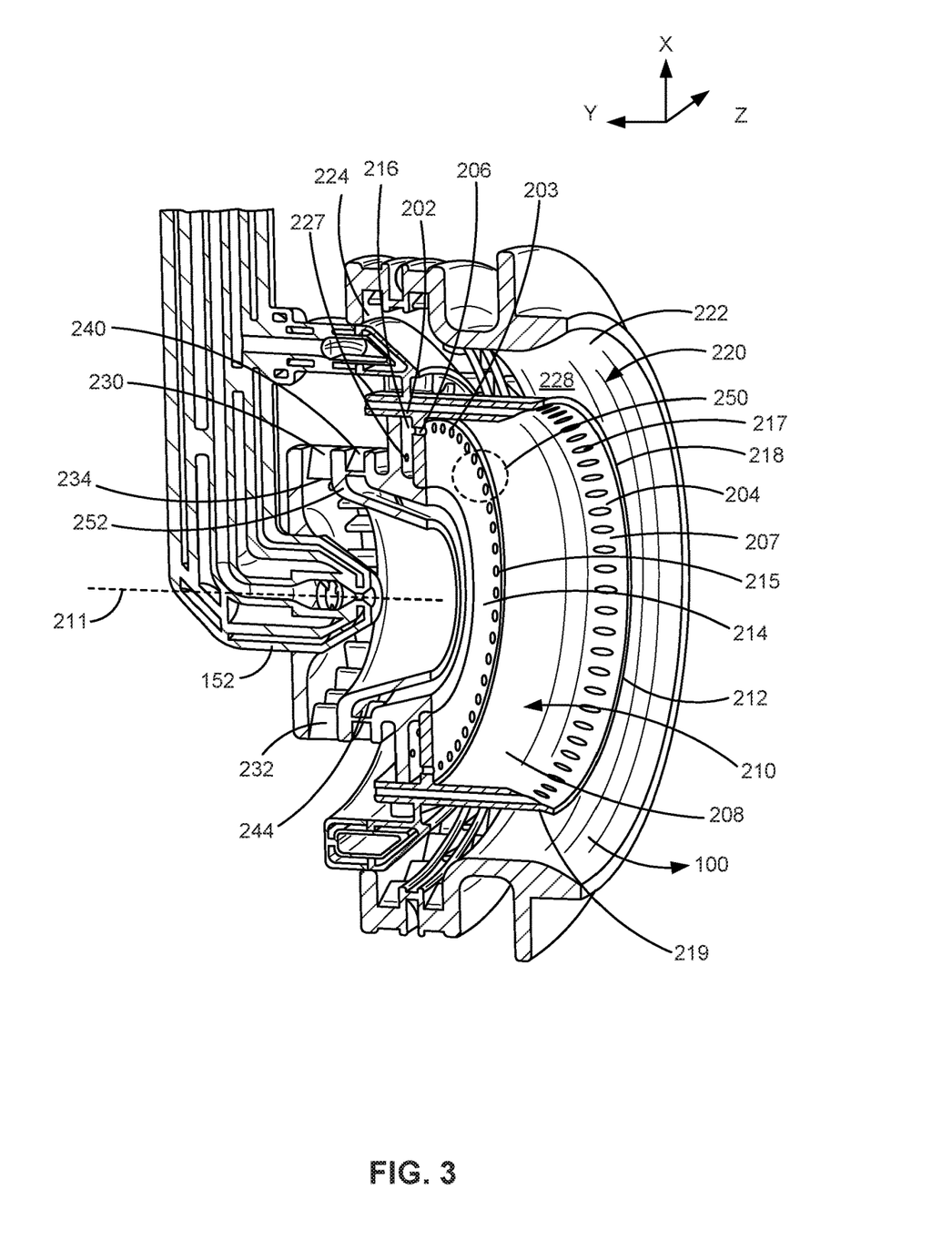
FIG. 3 is an enlarged partial perspective view of a mixer assembly in accordance with various embodiments.

FIG. 3 is an enlarged partial perspective view of the mixer assembly 200 for the exemplary combustor 100 of FIG. 2. The exemplary mixer assembly 200 includes a main mixer 220 and an annular pilot mixer housing 210. The annular pilot mixer housing 210 and the main mixer 220 are concentrically arranged with the annular pilot mixer housing 210 located in the center of the main mixer 220, which surrounds a portion of the annular pilot mixer housing 210. The mixer assembly 200 has a centerline axis 211. The annular pilot mixer housing 210 includes an annular pilot mixer housing 212 separating and sheltering the annular pilot mixer housing 210 from the main mixer 220 and forming the pilot mixer cavity 208. The annular pilot mixer housing 212 has a forward portion 202 and an aft portion 204, with the aft portion 204 having a larger diameter than the forward portion 202. The forward portion 202 of the annular pilot mixer housing 212 surrounds a portion of the fuel nozzle 152. The forward portion 202 and the aft portion 204 of the annular pilot mixer housing 212 are connected by a vertical wall (also referred to herein as a pilot mixer bulkhead wall) 214 aft of the fuel nozzle 152 and substantially perpendicular to the aft portion 204 of the annular pilot mixer housing 212, forming a corner 206 between the aft portion 204 of the annular pilot mixer housing 212 and the pilot mixer bulkhead wall 214. The main mixer 220 further includes an annular main mixer outer radial wall 222 radially surrounding a portion of the annular pilot mixer housing 212, the outer surface of which forms an annular main mixer inner radial wall 219, and a main mixer forward wall 224 substantially perpendicular to and connecting the annular main mixer outer radial wall 222 and the annular main mixer inner radial wall 219, forming a main mixer annular passage 228. The annular main mixer outer radial wall 222 further incorporates a plurality of radial swirlers, while the main mixer forward wall 224 further incorporates an axial swirler and a plurality of fuel injection holes circumferentially distributed between the radial swirlers and the axial swirler around the main mixer forward wall 224. The fuel injection holes are in flow communication with a fuel manifold (not shown), which in turn is in flow communication with a fuel supply. The fuel nozzle 152 dispenses fuel within the pilot mixer cavity 208. Although described with respect to liquid fuel, the exemplary embodiments of mixer assemblies 200 can also be used with gaseous fuel or partially vaporized fuel.

The forward portion 202 of the annular pilot mixer housing 210 incorporates a first swirler 230 radially surrounding a portion of the fuel nozzle 152 and located forward of the pilot mixer bulkhead wall 214. Adjacent to and aft of the first swirler 230, the forward portion 202 of the annular pilot mixer housing 210 incorporates a second swirler 240 radially surrounding a portion of the fuel nozzle 152 and located forward of the pilot mixer bulkhead wall 214. A swirler inner cone 252 separates the first swirler 230 and the second swirler 240. In various embodiments, the fuel/air mixture flowing from the annular pilot mixer housing 210 is co-rotating with the fuel/air mixture flowing from the main mixer 220 helping, along with the aft portion 204 of the annular pilot mixer housing 212, to minimize undesired mixing between the two airstreams, especially at low power operations where the cold air from the main mixer 220 may extinguish the flame of the annular pilot mixer housing 210.

Figure 4:
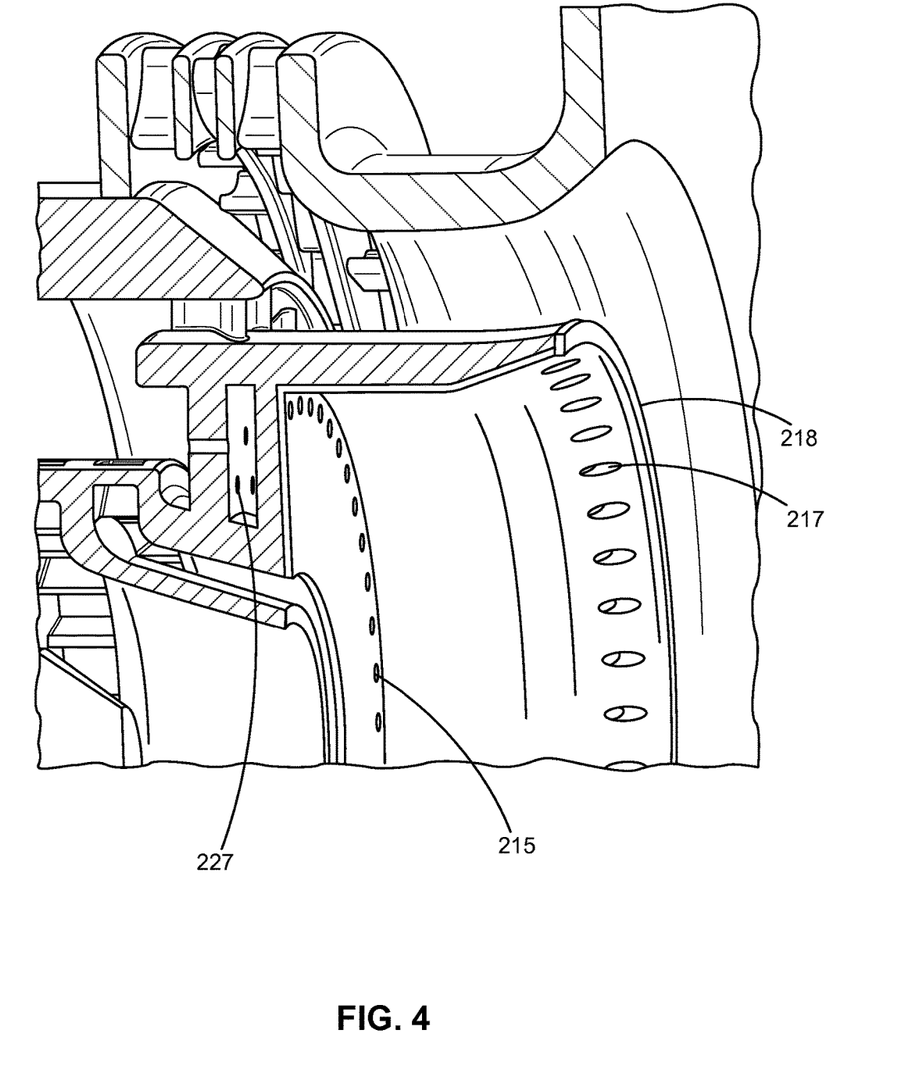
FIG. 4 is an enlarged localized view of through holes circumferentially distributed in a mixer assembly of a swirler of a combustor in accordance with various embodiments and FIG. 5 is an enlarged localized view of a portion of a backside of a mixer assembly in accordance with various embodiments.

As can been seen in FIG. 3 and FIG. 4, the first swirler 230 has a significantly greater radius than the second swirler 240. The first swirler 230 and second swirler 240 each have a plurality of vanes for swirling air traveling through the swirlers to mix the air and the fuel dispensed by the fuel nozzle 152. The first swirler 230 includes a first plurality of vanes 232 forming a first plurality of air passages 234 between the vanes 232. The second swirler 240 includes a second plurality of vanes forming a second plurality of air passages 244 between the vanes. Having different angles for the first swirler 230 and the second swirler 240 causes high shear and helps atomize and disperse the fuel film that forms on the swirler inner cone 252. The fuel film is sheared between swirling airstreams, breaking up the fuel film into small droplets because of the shear and instability in the film, thereby producing fine droplets. The configuration of the vanes in the swirlers may be altered to vary the swirl direction of air flowing and are not limited to the exemplary swirl directions indicated.

Once atomized and dispersed, the fuel and air mixture is ignited and forms a corner recirculation zone 250 recessed in the pilot mixer cavity 208 in the corner 206 between the aft portion 204 of the annular pilot mixer housing 212 and the pilot mixer bulkhead wall 214. This corner recirculation zone 250, which is effectively sheltered from the main mixer 220 by the aft portion 204 of the annular pilot mixer housing 212, is formed by the rapidly expanding air flowing from the narrow second swirler 240, which seeks to spread out quickly to the corner 206 within the pilot mixer cavity 208. The corner recirculation zone 250 allows for significant to complete combustion of the fuel before it leaves the annular pilot mixer housing 212 of the annular pilot mixer housing 210 and enters the annular combustion chamber 130 (see FIG. 2), minimizing the potential for producing CO and UHC due on improper or incomplete combustion. So while the center recirculation zone of the combustor 100 helps to stabilize the annular pilot mixer housing 210, the annular pilot mixer housing 210 has its own separate and independent source of stability.

According to various embodiments and with reference to FIG. 3, the outer surface of the pilot mixer housing 212, that is, the inner radial wall 219, is cooled by connective cooling provided by high velocity, highly turbulent swirling flow of air or fuel/air mixture flowing through the main mixer passage 228 and main axial swirler. The high velocity air flowing through the first plurality of holes 217 provides addition connective cooling to the pilot mixer housing 212. The tip and/or radial edge 218 of the annular pilot mixer housing 212 is also cooled by the cool air flowing from the first plurality of holes 217 disposed circumferentially through the annular pilot mixer housing 212 in proximity to the aft portion 204 of the annular pilot mixer housing 212. In this way, the first plurality of holes 217 disposed circumferentially through the annular pilot mixer housing 212 in proximity to the aft portion 204 of the annular pilot mixer housing 212 provide film cooling and purging to the radial edge 218 of the annular pilot mixer housing 212. The flow of air through the first plurality of holes 217 substantially flows parallel to the horizontal wall 207 of the aft portion 204 of the annular pilot mixer housing 212. The film cooling created by this flow is configured to stay in close proximity to the aft portion 204 of the annular pilot mixer housing 212 and/or the radial edge 218 of the annular pilot mixer housing 212 as the flow expands. The annular pilot mixer housing 210 has a pilot mixer forward wall 216 forward of the forward surface of the pilot mixer bulkhead wall 214, also connecting the forward portion 202 and the aft portion 204 of the annular pilot mixer housing 212. The first plurality of holes 227 are circumferentially distributed in, and extend through, the pilot mixer forward wall 216 through which cool air (relative to air originating in the combustor) passes to cool the forward surface of the pilot mixer bulkhead wall 214, providing backside impingement cooling of the annular pilot mixer housing 212. A second plurality of holes 215 are also circumferentially distributed in, and extend transversally through, the pilot mixer bulkhead wall 214 proximate an inner surface of the annular pilot mixer housing 212. At least a portion of the air passing through the second plurality of holes 215 also passes through the first plurality holes 227 to provide film cooling (such as a thermal barrier coating) of the inner surface of the annular pilot mixer housing 212 and/or provides backside impingement cooling.

According to various embodiments and with reference to FIG. 4, an enlarged partial perspective view of an exemplary embodiment of a mixer assembly is provided. In various embodiments, the number of holes multiplied by diameter of the holes is greater than 70% of the area at the radial edge 218 of the annular pilot mixer housing 212. Here, the radial edge 218 of the annular pilot mixer housing 212 is defined the by the inner diameter at the farthest aft portion of the annular pilot mixer housing 212. The first plurality of holes 217 may be positioned based on the location and diameter of the second plurality of holes 215. For instance, the first plurality of holes 217 may be separated a distance from the second plurality of holes 215 in the annular pilot mixer housing 212 by between about 10 to 20 aggregate diameters of the second plurality of holes 215 (i.e., between about 10*D2 to 20*D2, where D2 is the diameter of each of the second plurality of holes 215). In various embodiments, the cross-sectional length of the aggregated first plurality of holes 217 may be about 20% to 40% of the total circumferential length of the annular pilot mixer housing 212 at the location of the first plurality of holes 217.

According to various embodiments, the radial edge 218 of the annular pilot mixer housing 212 is devoid of purge cooling holes. In this way, direct purge air is not utilized to cool the radial edge 218 of the annular pilot mixer housing 212. Purge cooling air, as utilized herein, may refer to the footprint of a cooling hole airflow being presented at the site of desired cooling, in contrast to a footprint of a cooling hole in proximity to the site of desired cooling configured to flow over a surface to reach the site of desired cooling (e.g., film cooling).

Figure 5:
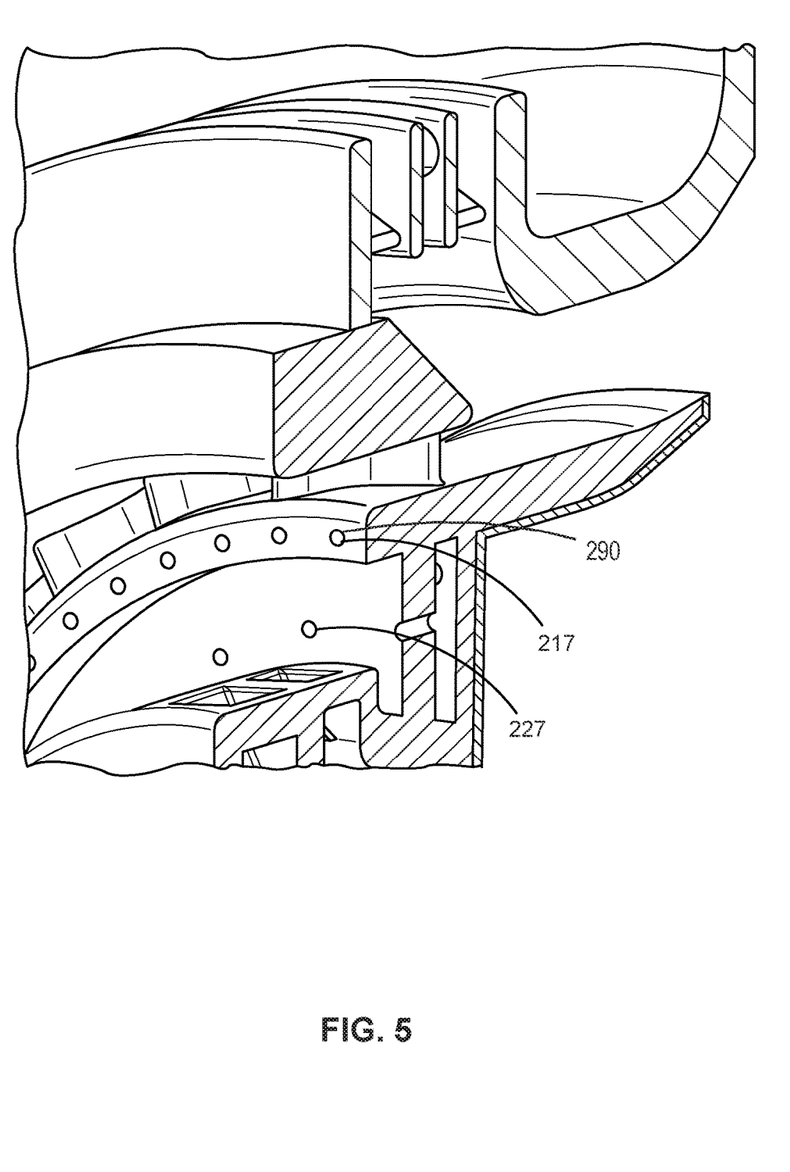

FIG. 5 shows the inlet part of the plurality of holes 217 and plurality of holes 227. The flow rate through the plurality of holes 217 can be metered by changing the diameter or the cross sectional area of the plurality of inlet passages 290 of the plurality of holes 217. For example, the inlet diameter of 217 can be smaller than the exit diameter of 217.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mixer assembly configured for a gas turbine engine comprising:
   a main mixer; and
   a pilot mixer concentrically arranged with the main mixer and having a centerline axis,
   wherein the main mixer surrounds at least a portion of the pilot mixer, the pilot mixer comprising an annular housing separating the pilot mixer from the main mixer and forming a cavity,
   wherein the annular housing has a forward portion and an aft portion, the aft portion has a larger diameter than the forward portion,
   wherein a first plurality of holes are disposed circumferentially through a radially outward wall of the annular housing adjacent to and forward of an aft edge of the annular housing, the first plurality of holes extending longitudinally substantially parallel to the centerline axis along their entire length through the annular housing and intersecting a radially inner surface of the radially outward wall, the radially inner surface increasing in diameter along an aft direction between the forward portion and the aft edge, an aft-most surface of the annular housing including the aft edge being devoid of purge cooling holes, and
   a second plurality of holes are circumferentially distributed in, and extending transversally through, a wall oriented normal to the radially outward wall of the annular housing, the wall extends radially inward from the radially outward wall.

2. The mixer assembly for a gas turbine engine of claim 1, wherein the first plurality of holes are separated from the second plurality of holes in the annular housing by a distance between about 10 and 20 times a diameter of one of the second plurality of holes.

3. The mixer assembly for a gas turbine engine of claim 1, wherein a flow rate through the first plurality of holes is metered by a plurality of inlet passages of the first plurality of holes.

4. The mixer assembly for a gas turbine engine of claim 1, wherein an aggregated circumferential length of the first plurality of holes is between 20% and 40% of a circumference of the annular housing at a location of the first plurality of holes.

5. The mixer assembly for a gas turbine engine of claim 1, wherein the first plurality of holes are configured to provide film cooling of the aft edge of the annular housing.

6. The mixer assembly for a gas turbine engine of claim 1, further comprising a thermal barrier coating on the radially inner surface of the aft portion of the annular housing.

7. The mixer assembly for a gas turbine engine of claim 1, wherein the annular housing, including the first plurality of holes, is formed via an additive manufacturing process.

8. A pilot mixer assembly configured for a gas turbine engine comprising:
   an annular housing separating a pilot mixer from a main mixer,
   wherein the pilot mixer has a centerline axis,
   wherein the annular housing has a forward portion and an aft portion, the aft portion has a larger diameter than the forward portion,
   wherein a first plurality of holes are disposed circumferentially through a horizontal wall of the annular housing adjacent to and forward of an aft edge of the annular housing, the first plurality of holes extending longitudinally substantially parallel to the centerline axis along their entire length through the annular housing and intersecting a radially inner surface of the horizontal wall, the radially inner surface increasing in diameter along an aft direction between the forward portion and the aft edge, an aft-most surface of the annular housing including the aft edge being devoid of purge cooling holes, and
   a second plurality of holes are circumferentially distributed in, and extending transversally through, a vertical wall of the annular housing, the vertical wall extends radially inward from the horizontal wall.

9. The pilot mixer assembly of claim 8, wherein the first plurality of holes are separated from the second plurality of holes in the annular housing by a distance of between 10 and 20 times a diameter of one of the second plurality of holes.

10. The pilot mixer assembly of claim 8, wherein a flow rate through the first plurality of holes is metered by a plurality of inlet passages of the first plurality of holes.

11. The pilot mixer assembly of claim 8, wherein an aggregated circumferential length of the first plurality of holes is between 20% and 40% of a circumference of the annular housing at a location of the first plurality of holes.

12. The pilot mixer assembly of claim 8, wherein the first plurality of holes are configured to provide film cooling of the aft edge of the annular housing.

13. The pilot mixer assembly of claim 8, wherein the pilot mixer is concentrically arranged with the main mixer.

14. The pilot mixer assembly of claim 8, wherein the annular housing, including the first plurality of holes, is formed via an additive manufacturing process.

15. The pilot mixer assembly of claim 8, wherein the aft edge surface of the annular housing is cooled absent direct purge cooling.

* * * * *

UNITED STATES PATENT AND TRADEMARK OFFICE
CERTIFICATE OF CORRECTION

PATENT NO. : 10,054,312 B2  
APPLICATION NO. : 14/631499  
DATED : August 21, 2018  
INVENTOR(S) : Zhogtao Dai and Kristin Kopp-Vaughan Page 1 of 1

It is certified that error appears in the above-identified patent and that said Letters Patent is hereby corrected as shown below:

In Column 9, Line 5 Claim 15, please delete "edge surface" and therefore insert -- surface --

Signed and Sealed this  
Ninth Day of October, 2018

Andrei Iancu  
*Director of the United States Patent and Trademark Office*